US012047725B2

(12) United States Patent
Vaalgamaa et al.

(10) Patent No.: US 12,047,725 B2
(45) Date of Patent: Jul. 23, 2024

(54) ADAPTIVE EARTIP FOR TRUE WIRELESS STEREO HEADSETS

(71) Applicant: HUAWEI TECHNOLOGIES CO., LTD., Shenzhen (CN)

(72) Inventors: Markus Vaalgamaa, Helsinki (FI); Laura Laaksonen, Helsinki (FI); Pirkka Myllykoski, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 17/793,843

(22) PCT Filed: Feb. 3, 2020

(86) PCT No.: PCT/EP2020/052598
§ 371 (c)(1),
(2) Date: Jul. 19, 2022

(87) PCT Pub. No.: WO2021/155900
PCT Pub. Date: Aug. 12, 2021

(65) Prior Publication Data

US 2023/0049385 A1 Feb. 16, 2023

(51) Int. Cl.
*H04R 5/02* (2006.01)
*H04R 1/10* (2006.01)
*H04R 5/033* (2006.01)

(52) U.S. Cl.
CPC ......... *H04R 1/1016* (2013.01); *H04R 1/1041* (2013.01); *H04R 1/1075* (2013.01); *H04R 5/033* (2013.01); *H04R 2420/07* (2013.01)

(58) Field of Classification Search
CPC .. H04R 1/1016; H04R 1/1041; H04R 1/1075; H04R 5/033
See application file for complete search history.

(56) References Cited

U.S. PATENT DOCUMENTS

| | | | | |
|---|---|---|---|---|
| 5,631,965 | A * | 5/1997 | Chang .................. | H04R 1/1083 381/74 |
| 2001/0043708 | A1* | 11/2001 | Brimhall .............. | H04R 25/656 381/328 |
| 2006/0042867 | A1 | 3/2006 | Haussmann et al. | |
| 2006/0042868 | A1* | 3/2006 | Berg ...................... | B33Y 80/00 181/135 |
| 2009/0116677 | A1* | 5/2009 | Jones ................... | H04R 25/656 381/380 |

(Continued)

FOREIGN PATENT DOCUMENTS

| | | | |
|---|---|---|---|
| DE | 102016011422 | A1 | 3/2017 |
| JP | 4742593 | B2 | 8/2011 |

(Continued)

*Primary Examiner* — Simon King
(74) *Attorney, Agent, or Firm* — Rimon PC

(57) ABSTRACT

An apparatus for fitting an earphone device in an ear canal using an anatomically shaped, compressible cushion member with a through channel and a spacer member extending from its side wall, but not connecting to its other side wall, thus providing sufficient acoustic signal transmission to the ear canal in all circumstances by ensuring a 5 minimum clearance C between the opposing side walls of the channel in both a non-compressed state and a compressed state of the cushion member, while also allowing for a flexible and comfortable design.

18 Claims, 2 Drawing Sheets

(56) References Cited

U.S. PATENT DOCUMENTS

| | | | | |
|---|---|---|---|---|
| 2011/0268308 | A1 | 11/2011 | Vasquez | |
| 2013/0163803 | A1 | 6/2013 | Erdel | |
| 2015/0049896 | A1 | 2/2015 | Blanchard | |
| 2015/0181330 | A1 * | 6/2015 | Rogers | H04R 1/1016 381/67 |
| 2015/0289061 | A1 * | 10/2015 | Rasmussen | H04R 25/02 381/328 |
| 2017/0094426 | A1 * | 3/2017 | Shen | H04R 25/02 |
| 2018/0098163 | A1 * | 4/2018 | Barrett | H04R 25/48 |
| 2020/0016005 | A1 * | 1/2020 | Roberts | A61F 11/08 |

FOREIGN PATENT DOCUMENTS

| | | | |
|---|---|---|---|
| JP | 2015005790 | A | 1/2015 |
| JP | 2015056782 | A | 3/2015 |

* cited by examiner

ADAPTIVE EARTIP FOR TRUE WIRELESS STEREO HEADSETS

CROSS-REFERENCE TO RELATED APPLICATIONS

This application is a US national stage of International Application No. PCT/EP2020/052598, filed on Feb. 3, 2020, which is hereby incorporated by reference in its entirety.

TECHNICAL FIELD

The disclosure relates in general to the technical field of personal listening audio devices such as earphones, headphones and headsets, and in particular to compressible eartips for true wireless stereo (TWS) in-ear type headsets.

BACKGROUND

With increased popularity of portable media players and mobile phones in recent years, the use of headphones has become commonplace. In the following disclosure, the term "headphones" will be used to refer to over-the-ear headphones as well as in-ear type headphones or earbuds.

Headsets such as true wireless stereo (TWS) headsets are a type of headphones comprising one or multiple microphones and can thus provide the equivalent functionality of a telephone handset with hands-free operation. These headsets are made with either a single-earpiece (mono) or a double-earpiece (mono to both ears or stereo). Among the many applications for (TWS) headsets, besides personal use for audio consumption and communication, are aviation, theatre or television studio intercom systems, and console or PC gaming.

In-ear type headphones are portable headphones with a compressible eartip at their end that is inserted in the ear canal itself to provide at least partial acoustic sealing from noises from the external environment. These in-ear type headphones are enjoying increasing popularity because they are compact and particularly well suited to mobile uses while commuting in public transport or other loud environments such as airplanes.

However, current eartips in these in-ear type headphones do not provide optimal wearing comfort for most users. Due to the physical characteristics of the human ear, the ear canal shape and angle varies from person to person (and may also vary between the ears of a single person). Existing eartip designs only allow partial adaptation to different shapes of ears and struggle especially with slim and angled ears. In particular, many existing eartips are compromises between comfort, adaptation to different ears, and means to prevent collapse of soft ear tips, and often prevent the audio port being open for acoustic signal transmission from headset to ear while being pushed into the ear canal. In practice, round eartips are the easiest to manufacture, even though most ear canals are not round but anatomically ovally shaped. The optimal oval shape is however difficult to manufacture in a way to provide acoustic signal transmission in all circumstances.

Some eartip manufacturers offer partial solutions to the above-mentioned problems by providing both round and oval eartips for their headphones, but often with sound ports that can be easily closed by compression when inserted in narrow or irregularly shaped ear canals. Some other vendors make the body of the eartip very rigid so it cannot be closed by applying compression, but these eartips do not adapt to different ear canals and are thus uncomfortable to wear.

Another existing solution offers an eartip that has a cross-shaped support in the middle that can prevent closing of the sound port, but this design is not flexible and comfortable for slim ear canals, and too rigid as a structure.

There exists therefore a need for headphone or headset eartips that provide good wearing comfort over extended periods while also providing sufficient acoustic signal transmission to the ear canal in all circumstances, and that are easy and affordable to manufacture.

SUMMARY

It is an object to provide an improved apparatus and system for fitting an earphone device in an ear canal which overcomes or at least reduces the problems mentioned above.

The foregoing and other objects are achieved by the features of the independent claims. Further implementation forms are apparent from the dependent claims, the description and the figures.

According to a first aspect, there is provided an apparatus for fitting an earphone device in an ear canal, the apparatus comprising:

- an anatomically shaped, compressible cushion member adapted to fit into an ear canal;
- a channel arranged in the cushion member extending from a first side to a second side, the channel comprising at least two opposing side walls; and
- at least one spacer member extending from at least one of the side walls towards an opposing side wall, but not being connected to the opposing side wall;
- the at least one spacer member being configured to provide a minimum clearance C between the opposing side walls to allow acoustic waves to traverse the channel from the first side to the second side in both a non-compressed state and a compressed state of the cushion member.

Arranging a spacer member in an eartip (cushion member) extending from a side wall of an (acoustic) channel towards an opposing side wall while not being connected to it ensures both compressibility for fitting in all shapes of ear canals, as well as sufficient acoustic signal transmission through the channel to the ear canal in all circumstances (even when compressed in narrow ear canals). The simple structure of the eartip further allows for the eartip to be designed and manufactured easily and affordably from a flexible material that can provide good wearing comfort over extended periods.

In an embodiment the anatomically shaped cushion member is ovally shaped.

In a possible implementation form of the first aspect the cushion member and the channel are ovally shaped, the channel comprising a first pair of opposing side walls defined by a smaller curvature and a second pair of opposing side walls defined by a larger curvature.

In a further possible implementation form of the first aspect the at least one spacer member comprises a bump protruding from one of the first pair of opposing side walls, the bump being homogeneous with the cushion member.

In a further possible implementation form of the first aspect the at least one spacer member comprises two bumps, each bump protruding from one of the first pair of opposing side walls respectively.

In a further possible implementation form of the first aspect the cushion member is made from a flexible and resilient material, and wherein the at least one spacer member comprises a reinforcement flange attached to at least one of the second pair of opposing side walls, the reinforcement flange being made from a less flexible material than the cushion member.

In an embodiment the cushion member is made from silicone. In a further possible embodiment, the cushion member is made from a silicon material with a Shore durometer of 25, and the reinforcement flange is made from more rigid silicon material, preferably ranging between a Shore durometer of 40 and 60.

In a further possible implementation form of the first aspect the at least one spacer member comprises two reinforcement flanges, each reinforcement flange attached to one of the second pair of opposing side walls respectively.

In a further possible implementation form of the first aspect the spacer member is arranged to only partially extend between the first side and the second side within the channel; wherein the cushion member further comprises a continuous groove arranged within the side walls of the channel, in a section of the channel where the spacer member does not extend, to enable flexible adaptation of the cushion member to curved ear canals.

In a further possible implementation form of the first aspect the cushion member comprises an elongated, hollow body with an enclosed body cavity surrounding the channel, thereby providing additional bending flexibility and compressibility.

In a further possible implementation form of the first aspect the body cavity is open towards one side of the cushion member to provide a connection groove for connecting to an earphone housing.

In a further possible implementation form of the first aspect the cushion member and the spacer member are configured so that the minimum clearance C between the opposing side walls in a compressed state ranges between 1-1.5 mm; a smallest total width of the cushion member measured in the compressed state is 3.5 mm; and a smallest cross-sectional area of the channel measured in the compressed state is 5 $mm^2$.

According to a second aspect, there is provided an earphone device comprising:

- an apparatus according to any one of the possible implementation forms of the first aspect;
- a housing adapted to be detachably connected to the cushion member of the apparatus at the first side; and
- a speaker arranged in the housing and configured to generate sound waves, in response to an audio signal, for delivery through the channel towards the ear canal.

Combining a compressible eartip comprising a spacer member according to a possible implementation form the first aspect and an earphone housing with a speaker to be detachably connected allows for an earphone design that ensures good wearing comfort over extended periods while also providing sufficient acoustic signal transmission to the ear canal in all circumstances.

In a possible implementation form of the second aspect the detachable connection between the housing and the cushion member is a snap-fit connection between a connection groove arranged at the first side of the cushion member and a correspondingly shaped connection rim arranged on the housing.

In a further possible implementation form of the second aspect the cushion member is adapted to, when fitted into an ear canal, substantially fill a cross-section of the ear canal;

- wherein the cushion member and the housing are arranged to, when connected, provide an acoustic sealing between a first portion of the ear canal towards an ear drum and a second portion of the ear canal towards an external environment.

According to a third aspect, there is provided a system comprising:

- at least one earphone device according to any one of the possible implementation forms of the first aspect; and
- a host device arranged in data connection with the at least one earphone device and configured to generate the audio signal for delivery to the speaker via the data connection.

Combining the earphone device in data connection with a host device allows for the earphone device to be implemented without own storage and with limited processing means, resulting in a simpler construction that enables a small size and lighter weight, which are of high importance in the case of TWS headsets.

In a possible implementation form of the third aspect the earphone device is a True Wireless Stereo (TWS) headset, the host device is a mobile smartphone, and the data connection is established using a Bluetooth protocol.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
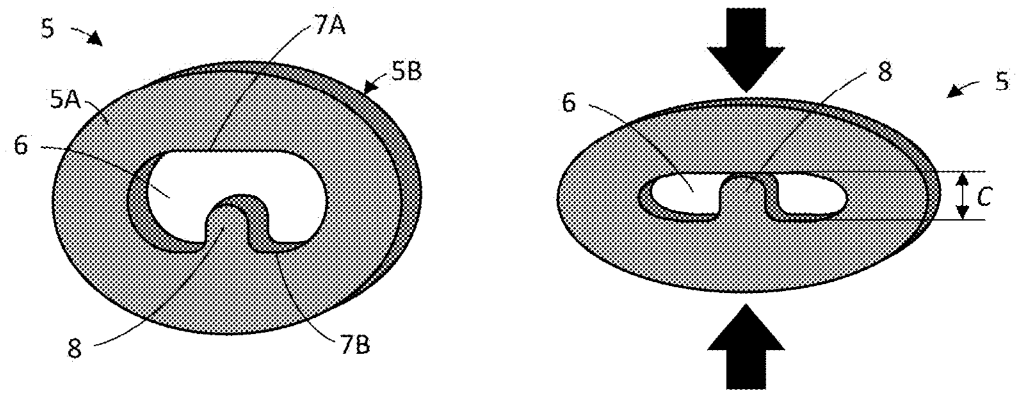
FIG. 1 shows 3D front views of a cushion member in accordance with an embodiment of the first aspect in a non-compressed state and a compressed state.

FIG. 1 illustrates an apparatus according to the present disclosure, comprising an anatomically shaped, compressible cushion member 5 with a first side 5A (to the front) and a second side 5B (to the back) and a channel 6 arranged in the cushion member 5 extending from the first side 5A to the second side 5B for enabling acoustic signal transmission through the cushion member 5, generated e.g. by a speaker 15 such as described below in relation to FIG. 5.

Herein "anatomically shaped" is meant to cover all possible shapes which are based on or designed to adapt to the structure of human body parts, in particular to the human concha and ear canal.

The channel 6 comprises at least two opposing side walls 7A, 7B and a spacer member 8 extending from one of the side walls 7B towards the opposing side wall 7A, without reaching or being connected to the opposing side wall 7A.

While the figure on the left illustrates the shape of the cushion member 5 in a non-compressed state, the figure on the right illustrates a compressed state of the cushion member 5. As can be seen from the figures, the spacer member 8 is configured to provide a minimum clearance C between the opposing side walls 7A, 7B to allow acoustic waves to traverse the channel 6 from the first side 5A to the second side 5B in both a non-compressed state and a compressed state of the cushion member 5.

In possible embodiments the cushion member 5 is ovally shaped. In further possible embodiments the cushion member 5 and the channel 6 are both ovally shaped.

Figure 2:
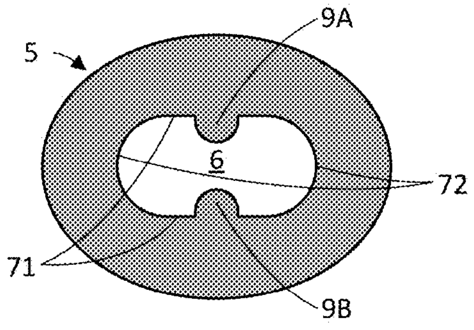
FIG. 2 is a cross-sectional view illustrating a spacer member in accordance with an embodiment of the first aspect.

In one embodiment illustrated in FIG. 2, the channel 6 in the cushion member 5 comprises a first pair of opposing side walls 71 defined by a smaller curvature and a second pair of opposing side walls 72 defined by a larger curvature. The spacer member 8 may be implemented as a bump 9 protruding from one of the first pair of opposing side walls 71, the bump 9 being homogeneous with the cushion member 5, as shown in FIG. 1, or as two bumps 9A, 9B, each bump 9A or 9B protruding from one of the first pair of opposing side walls 71 respectively as shown in FIG. 2. The homogeneous structure of these embodiments allows for easy and cheap manufacture of eartips to be used in headphones.

Figure 3:
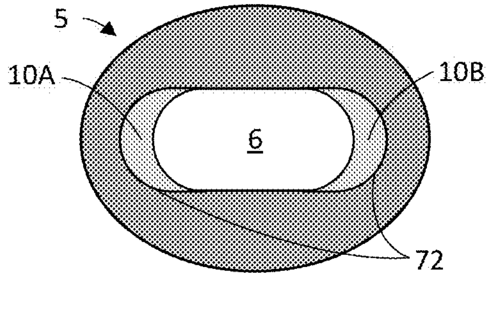
FIG. 3 is a cross-sectional view illustrating a spacer member in accordance with another embodiment of the first aspect.

In another embodiment illustrated in FIG. 3, the cushion member 5 is made from a flexible and resilient material, such as silicone, and the at least one spacer member 8 is implemented as a reinforcement flange 10 attached to at least one of the second pair of opposing side walls 72. In the illustrated embodiment the cushion member 5 comprises two reinforcement flanges 10A and 10B, each reinforcement flange 10A or 10B attached to one of the second pair of opposing side walls 72 respectively. An important aspect of this embodiment is that the reinforcement flange(s) 10 are made from a less flexible material than the cushion member 5. In a possible embodiment, the cushion member is made from a silicon material with a Shore durometer of 25, and the reinforcement flange is made from more rigid silicon material, preferably ranging between a Shore durometer of 40 and 60.

Figure 4:
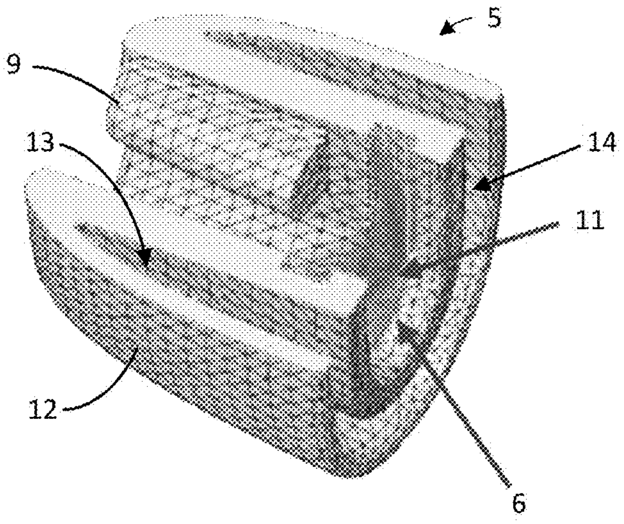
FIG. 4 is a 3D view illustrating one half of a cushion member in accordance with another embodiment of the first aspect.

In a further possible embodiment shown in FIG. 4, the spacer member 8 is arranged to only partially extend between the first side 5A and the second side 5B within the channel 6, thereby allowing for less material to be used to achieve savings of manufacture costs as well as making the structure lighter while still providing sufficient spacing between side walls 7A and 7B.

In a possible embodiment the cushion member 5 further comprises a continuous groove 11 arranged within the side walls of the channel 6, in a section of the channel 6 where the spacer member 8 does not extend, to enable flexible adaptation of the cushion member 5 to curved ear canals 4.

In a further possible embodiment, the cushion member 5 comprises an elongated, hollow body 12 with an enclosed body cavity 13 surrounding the channel 6, thereby providing additional bending flexibility and compressibility as well as further savings of manufacture costs. In a possible embodiment the body cavity 13 is open towards one side 5A or 5B of the cushion member 5 to provide a connection groove 14 for connecting to an earphone housing 3, such as the one illustrated in FIG. 5.

In a possible embodiment the cushion member 5 and the spacer member 8 are configured so that the minimum clearance C between the opposing side walls 7A,7B in a compressed state ranges between 1-1.5 mm.

In a possible embodiment the cushion member 5 and the spacer member 8 are configured so that a smallest total width of the cushion member 5 measured in the compressed state is 3.5 mm.

In a possible embodiment the cushion member 5 and the spacer member 8 are configured so that a smallest cross-sectional area of the channel 6 measured in the compressed state is 5 $mm^2$.

Figure 5:
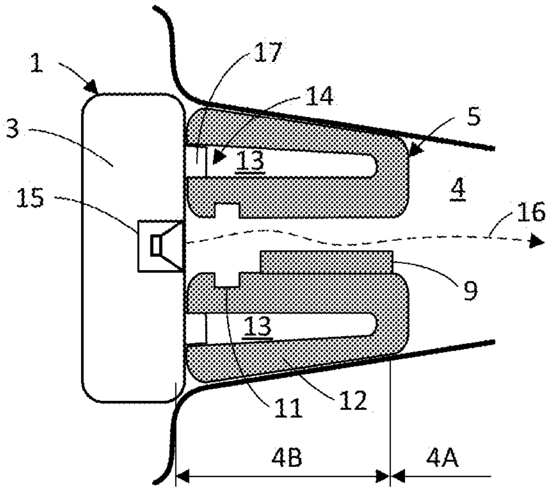
FIG. 5 shows a cross-section of an earphone device, arranged in an ear canal, in accordance with an embodiment of the second aspect.

FIG. 5 illustrates an earphone device 1 according to the present disclosure, wherein features that are the same or similar to corresponding features previously described or shown herein are denoted by the same reference numeral as previously used for simplicity. In this illustrated embodiment the earphone device 1 comprises a housing 3 to be detachably connected to the cushion member 5 of the apparatus at the first side 5A.

In an embodiment the detachable connection between the housing 3 and the cushion member 5 is a snap-fit connection between a connection groove 14 arranged at the first side 5A of the cushion member 5 and a correspondingly shaped connection rim 17 arranged on the housing 3.

Herein a "snap-fit connection" refers to an assembly method used to attach flexible parts, usually plastic, to form the final product by pushing the interlocking components of the parts together.

As illustrated in FIG. 5, the cushion member 5 may be adapted to, when fitted into an ear canal 4, substantially fill a cross-section of the ear canal 4, so that the cushion member 5 and the housing 3 is able to, when connected, provide an acoustic sealing between a first portion 4A of the ear canal 4 towards an ear drum and a second portion 4B of the ear canal 4 towards an external environment.

A speaker 15 may also be arranged in the housing 3 and configured to generate sound waves 16, in response to an audio signal, for delivery through the channel 6 towards the ear canal 4. The speaker 7 may comprise a front cavity and a back cavity isolated from the front cavity for optimal sound wave generation.

In possible embodiments, a dial such as a volume knob may further be arranged on the housing 3 towards the external environment for adjusting at least one of the overall output level of the speaker 15 or a balance between signal components of the input audio signal.

In possible embodiments (not shown) the earphone device 1 may further comprise a microphone arranged in the housing 3 and configured to capture sound waves from the direction of the external environment. In an embodiment (also not shown), the earphone device 1 may comprise at least two microphones configured to be oriented towards the mouth of a user of the earphone device 1 to enable acoustic beamforming.

In a further embodiment (also not shown) the earphone device 1 may further comprise a voice accelerometer configured to detect presence of the voice of a user of the earphone device 1 via vibrations.

These additional inputs can generate further input signals that can be used as further components to be mixed in the input audio signal for the speaker 15, or to control other functions of the earphone device 1 (such as de-occlusion).

Figure 6:
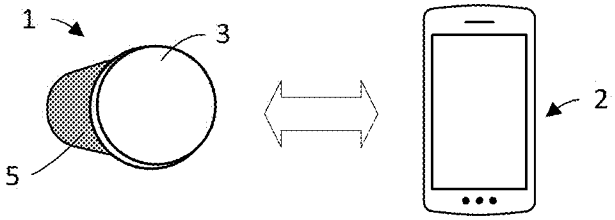
FIG. 6 shows a system with an earphone device in data connection with a host device in accordance with an embodiment of the third aspect.

FIG. 6 shows a system according to the present disclosure comprising at least one earphone device 1 in accordance with any above described embodiment comprising a housing 3 and a connected cushion member 5, and a host device 2 arranged in data connection with the at least one earphone device 1. Although in FIG. 6 the system is illustrated with a single earphone device 1, in most embodiments the system would comprise two earphone devices 1, corresponding to a TWS earphone system, and configured to be used in a left and right ear of a user respectively, with no wired connection between the earphone devices 1.

The host device 2 may be a mobile smartphone and the data connection may e.g. be established using a Bluetooth or Bluetooth Low Energy (BLE) protocol.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:

1. An apparatus for fitting an earphone device in an ear canal, the apparatus comprising:

a compressible cushion member adapted to fit into an ear canal;

a channel arranged in said cushion member extending from a first side to a second side, said channel comprising at least two opposing side walls; and at least one spacer member extending from at least one of said side walls towards an opposing side wall, but not being connected to said opposing side wall;

wherein said at least one spacer member is configured to provide a minimum clearance C between said opposing side walls to allow acoustic waves to traverse said channel from said first side to said second side in both a non-compressed state and a compressed state of said cushion member.

2. An apparatus according to claim 1, wherein said cushion member and said channel are ovally shaped, said channel comprising a first pair of opposing side walls defined by a smaller curvature and a second pair of opposing side walls defined by a larger curvature.

3. An apparatus according to claim 2, wherein said at least one spacer member comprises a bump protruding from one of said first pair of opposing side walls, said bump being homogeneous with said cushion member.

4. An apparatus according to claim 3, wherein said at least one spacer member comprises two bumps, each bump protruding from one of said first pair of opposing side walls respectively.

5. An apparatus according to claim 2, wherein said cushion member is made from a flexible and resilient material, such as silicone, and wherein said at least one spacer member comprises a reinforcement flange attached to at least one of said second pair of opposing side walls, said reinforcement flange being made from a less flexible material than said cushion member.

6. An apparatus according to claim 5, wherein said at least one spacer member comprises two reinforcement flanges, each reinforcement flange attached to one of said second pair of opposing side walls respectively.

7. An apparatus according to claim 1, wherein said spacer member is arranged to partially extend between said first side and said second side within said channel; and wherein said cushion member further comprises a continuous groove arranged within the side walls of said channel, in a section of said channel where the spacer member does not extend, to enable flexible adaptation of the cushion member to curved ear canals.

8. An apparatus according to claim 1, wherein said cushion member comprises an elongated, hollow body with an enclosed body cavity surrounding said channel, thereby providing additional bending flexibility and compressibility.

9. An apparatus according to claim 8, wherein said body cavity is open towards one side of the cushion member to provide a connection groove for connecting to an earphone housing.

10. An apparatus according to claim 1, wherein said minimum clearance C between said opposing side walls in a compressed state ranges between 1-1.5 mm;

a smallest total width of said cushion member measured in said compressed state is 3.5 mm; and a smallest cross-sectional area of said channel measured in said compressed state is 5 square mm.

11. An apparatus according to claim 1, wherein the compressible cushion member is anatomically shaped.

12. An earphone device comprising:

an apparatus for fitting into an ear canal, the apparatus comprising:

a compressible cushion member adapted to fit into an ear canal;

a channel arranged in said cushion member extending from a first side to a second side, said channel comprising at least two opposing side walls; and at least one spacer member extending from at least one of said side walls towards an opposing side wall, but not being connected to said opposing side wall, said at least one spacer member being configured to provide a minimum clearance C between said opposing side walls to allow acoustic waves to traverse said channel from said first side to said second side in both a non-compressed state and a compressed state of said cushion member;

a housing adapted to be detachably connected to the cushion member of said apparatus at said first side; and a speaker arranged in said housing and configured to generate sound waves, in response to an audio signal, for delivery through said channel towards said ear canal.

13. An earphone device according to claim 12, wherein said detachable connection between said housing and said cushion member is a snap-fit connection between a connection groove arranged at said first side of the cushion member and a correspondingly shaped connection rim arranged on said housing.

14. An earphone device according to claim 12, wherein said cushion member is adapted to, when fitted into an ear canal, substantially fill a cross-section of said ear canal; and wherein said cushion member and said housing are arranged to, when connected, provide an acoustic sealing between a first portion of the ear canal towards an ear drum and a second portion of the ear canal towards an external environment.

15. A system according to claim 12, wherein the compressible cushion member is anatomically shaped.

16. A system comprising:

at least one earphone device, the earphone device comprising:

an apparatus for fitting the earphone device in an ear canal, the apparatus comprising:

a compressible cushion member adapted to fit into an ear canal;

a channel arranged in said cushion member extending from a first side to a second side, said channel comprising at least two opposing side walls; and at least one spacer member extending from at least one of said side walls towards an opposing side wall, but not being connected to said opposing side wall, said at least one spacer member being configured to provide a minimum clearance C between said opposing side walls to allow acoustic waves to traverse said channel from said first side to said second side in both a non-compressed state and a compressed state of said cushion member; and a host device arranged in data connection with said at least one earphone device and configured to generate said audio signal for delivery to said speaker via said data connection.

17. A system according to claim 16, wherein said earphone device is a True Wireless Stereo (TWS) headset, said host device is a mobile smartphone, and said data connection is established using a Bluetooth protocol.

18. A system according to claim 16, wherein the compressible cushion member is anatomically shaped.

* * * * *